(12) United States Patent
Ichikawa

(10) Patent No.: US 10,348,227 B2
(45) Date of Patent: Jul. 9, 2019

(54) ELECTRIC POWER TOOL

(71) Applicant: MAKITA CORPORATION, Anjo-shi, Aichi (JP)

(72) Inventor: Yoshitaka Ichikawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 8 days.

(21) Appl. No.: 15/278,523

(22) Filed: Sep. 28, 2016

(65) Prior Publication Data
US 2017/0093315 A1   Mar. 30, 2017

(30) Foreign Application Priority Data

Sep. 30, 2015 (JP) ................. 2015-193777

(51) Int. Cl.
*H02P 3/14* (2006.01)
*H02P 6/24* (2006.01)
*H02K 11/215* (2016.01)
*H02P 23/20* (2016.01)
*B25F 5/00* (2006.01)
*H02P 27/08* (2006.01)
*H02P 29/024* (2016.01)

(52) U.S. Cl.
CPC ............... *H02P 6/24* (2013.01); *B25F 5/00* (2013.01); *H02K 11/215* (2016.01); *H02P 23/20* (2016.02); *H02P 27/08* (2013.01); *H02P 29/0241* (2016.02)

(58) Field of Classification Search
CPC ...... H02P 3/14; H02P 3/12; H02P 3/16; H02P 3/22; H02P 3/26; H02P 21/36
See application file for complete search history.

(56) References Cited

U.S. PATENT DOCUMENTS

| | | | | |
|---|---|---|---|---|
| 4,581,565 | A * | 4/1986 | Van Pelt | H02P 7/04 318/294 |
| 5,083,067 | A | 1/1992 | Soushin et al. | |
| 6,118,241 | A * | 9/2000 | Kazlauskas | H02P 6/24 318/299 |
| 7,400,106 | B2 * | 7/2008 | DeCicco | B25B 21/00 318/293 |
| 8,931,576 | B2 * | 1/2015 | Iwata | B25F 5/00 173/176 |
| 9,114,536 | B2 * | 8/2015 | Sussman | B25J 19/0004 |
| 2005/0189895 | A1 * | 9/2005 | Muroi | B41J 19/202 318/376 |
| 2010/0315025 | A1 * | 12/2010 | Yundt | H02P 21/36 318/375 |
| 2013/0207581 | A1 * | 8/2013 | Aoki | H02P 3/22 318/400.21 |
| 2014/0300300 | A1 * | 10/2014 | Winker | H02P 6/15 318/400.09 |

FOREIGN PATENT DOCUMENTS

JP          H03-74194 A      3/1991

* cited by examiner

*Primary Examiner* — Bickey Dhakal
(74) *Attorney, Agent, or Firm* — Oliff PLC

(57) ABSTRACT

One aspect of the present disclosure relates to an electric power tool including a motor, an operation unit, a bridge circuit, and a control unit. The control unit performs a brake control when the motor is braked, and performs a regenerative current inhibition control before stopping the brake control when a drive command is inputted to the operation unit while the brake control is performed.

8 Claims, 12 Drawing Sheets

ELECTRIC POWER TOOL

CROSS-REFERENCE TO RELATED APPLICATIONS

This application claims the benefit of Japanese Patent Application No. 2015-193777 filed on Sep. 30, 2015 with the Japan Patent Office, the disclosure of which is incorporated herein by reference.

BACKGROUND

The present disclosure relates to a technique to perform a brake control that decelerates or stops a motor by generating a braking force on the motor.

An electric power tool disclosed in Japanese Unexamined Patent Application Publication No. 3-74194 performs so-called short-circuit braking in which a motor control device generates a braking force on a motor by forming a short circuit between terminals of the motor through a bridge circuit to decelerate or stop the motor.

This control device is configured to control driving of a three-phase brushless motor and includes a bridge circuit having a total of six switching elements, each of which is provided between a corresponding one of terminals of the three-phase brushless motor and a positive electrode side or a negative electrode side of a direct-current power source.

From among the switching elements, switching elements on the negative electrode side (so-called low-side switches) are turned into an on-state and switching elements on the positive electrode side (so-called high-side switches) are turned into an off-state when the control device generates a braking force on the motor.

This control device can thus control the driving and braking of the motor only by switching the on/off-state of the switching elements in the bridge circuit.

SUMMARY

When a drive command is externally inputted to the aforementioned control device while a brake control such as the aforementioned short-circuit braking is performed, the control device stops the brake control and starts driving the motor.

In order to immediately stop the brake control to start driving the motor, all switching elements having been turned into the on-state by the brake control are concurrently turned into the off-state.

A switching element typically includes a diode coupled thereto in parallel for allowing an electric current to flow from the negative electrode side to the positive electrode side of the direct-current power source when the switching element is turned off.

Thus, concurrently turning off all the switching elements that are on in the bridge circuit to stop the brake control sometimes leads to an increase in a power supply voltage since brake-current flow paths are thereby blocked to produce a high voltage in windings of the motor, which causes a regenerative current to flow through diodes.

This results in a temporarily high power supply voltage caused by the regenerative current, leading to a possible deterioration of the switching elements and a power supply unit such as a battery.

It is desirable in one aspect of the present disclosure to inhibit the increase in the power supply voltage when the driving of the motor is started according to the drive command while the brake control is performed.

An electric power tool according to one aspect of the present disclosure comprises a motor, an operation unit, a bridge circuit, and a control unit.

The operation unit is configured such that a drive command for a motor is inputted thereto. The bridge circuit comprises a plurality of switching elements and is configured to switch current flow paths to the motor by the plurality of switching elements. The control unit is configured to control the bridge circuit according to the drive command inputted to the operation unit to thereby control driving of the motor. The control unit is further configured to perform a brake control to when the motor is braked, and to perform a regenerative current inhibition control before stopping the brake control when the drive command is inputted to the operation unit while the brake control is performed. The brake control is set to control the bridge circuit to generate a braking force on the motor. The regenerative current inhibition control is set to control the bridge circuit to inhibit generation of a regenerative current on the motor.

The electric power tool thus configured can inhibit an increase in a power supply voltage when the driving of the motor is started according to the drive command while the brake control is performed.

Each of the plurality of switching elements may comprise a diode coupled thereto in parallel.

In such a case, the brake control may be set to turn on at least part of the plurality of switching elements to generate the braking force, and the regenerative current inhibition control may be set to turn off all switching elements that are on, from among the plurality of switching elements, at given individual timings. Each given individual timings may be a timing that allows a brake current to flow via the diode of each corresponding one of all the switching elements that are on.

The electric power tool can inhibit the regenerative current caused to flow to the power source by turning all the switching elements that are on in the bridge circuit into the off-state to stop the brake control in a transition from the brake control to a motor drive control.

This inhibits occurrence of problems caused by the regenerative current such as a deterioration of a device on a current flow path to the motor formed via the bridge circuit and a high power supply voltage, thus allowing the motor to be properly driven according to the drive command from the operation unit.

The regenerative current inhibition control may be set to continue the brake control until a given timing when no further regenerative current flows in the power source of the motor via the bridge circuit.

Continuing the brake control until when no further regenerative current flows to the power source in the transition from the brake control to the motor drive control also inhibits the regenerative current flowing to the power source when the brake control is stopped, thus providing a similar effect to that described above.

The regenerative current inhibition control may be set to reduce a brake current flowing in the motor by switching control methods of the brake control.

In such a case, the brake control can be stopped after the brake current is reduced in the transition from the brake control to the motor drive control, thus inhibiting the regenerative current flowing to the power source when the brake control is stopped. The control unit thus configured can provide a similar effect to that described above.

The motor may comprise windings of a plurality of phases.

In such a case, the brake control may be set to control the bridge circuit to generate the braking force by short-circuiting at least two phases out of the windings of the plurality of phases, and the regenerative current inhibition control may be set to reduce phases short-circuited in the brake control.

The electric power tool thus configured can reduce the brake current by reducing phases used in a so-called short-circuit braking in the transition from the brake control to the motor drive control. This can inhibit the regenerative current flowing to the power source when the brake control is terminated, thus providing a similar effect to that described above.

The windings of the plurality of phases may comprise windings of three phases.

In such a case, the brake control may be set to perform three-phase short-circuit braking that short-circuits the three phases, and the regenerative current inhibition control may be set to perform two-phase short-circuit braking that short-circuits two phases of the three phases.

The brake control may be set to perform two-phase short-circuit braking that short-circuits two phases out of the plurality of phases, and the regenerative current inhibition control may be set to perform one-phase short-circuit braking that short-circuits one phase of the two phases.

The control unit may be configured (i) to perform the brake control at least when the drive command is not inputted thereto from the operation unit, (ii) to control the bridge circuit to reduce a brake current flowing in the motor in the regenerative current inhibition control, and (iii) to start driving the motor without performing the regenerative current inhibition control when the drive command is inputted thereto from the operation unit while the brake control is not performed.

In such a case, the control unit may perform the regenerative current inhibition control to reduce the brake current flowing in the motor and then start driving the motor when the drive command is inputted to the control unit from the operation unit while the brake control is performed.

The control unit may start driving the motor without performing the regenerative current inhibition control when the drive command is inputted thereto from the operation unit while the brake control is not performed.

The brake current can thus be reduced by the regenerative current inhibition control when the brake control is switched to the motor drive control.

Thus, the control unit thus configured can inhibit the regenerative current flowing to the power source when the driving of the motor is started, thus providing a similar effect to that described above.

BRIEF DESCRIPTION OF THE DRAWINGS

Example embodiments of the present disclosure will now be described by way of example with reference to the accompanying drawings, in which.

DETAILED DESCRIPTION OF THE PREFERRED EMBODIMENTS

Figure 1:
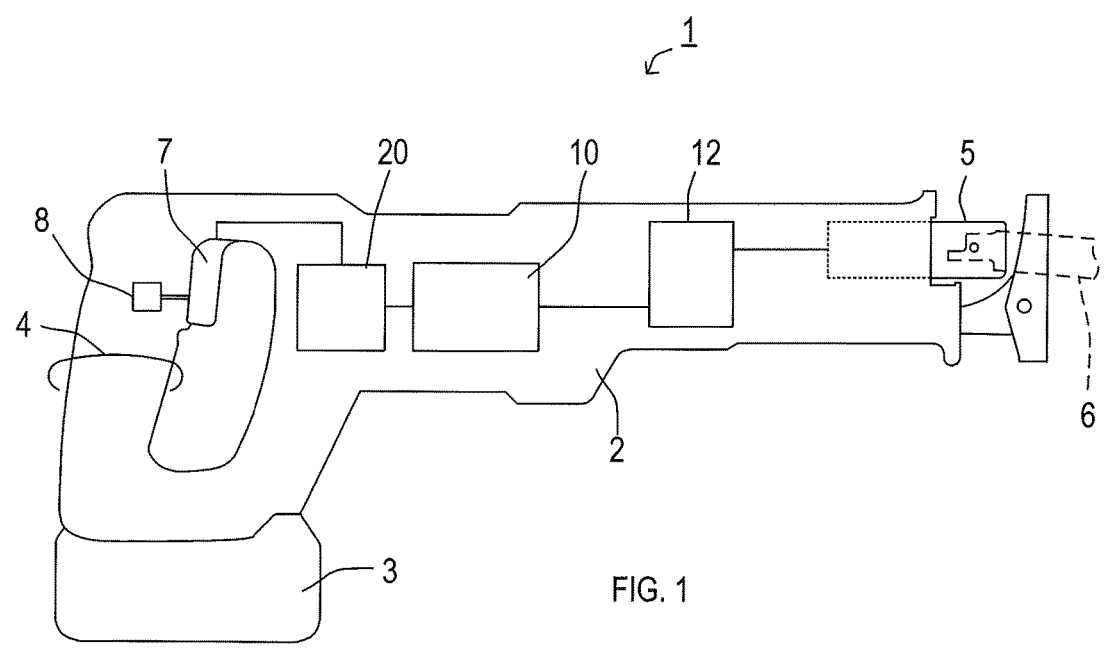
FIG. 1 is an explanatory diagram schematically illustrating a structure of an electric power tool according to an embodiment.

As shown in FIG. 1, an electric power tool 1 according to the present embodiment is a reciprocating saw used to cut materials to be processed such as wood and metal, and comprises a tool body 2 and a battery pack 3. An end of the tool body 2 is configured such that the battery pack 3 is removably attachable thereto. FIG. 1 shows a state in which the battery pack 3 is attached to the tool body 2.

The tool body 2 comprises a grip portion 4, a blade holder 5, a blade 6, a trigger 7, a lock-off button 8, a motor 10, a transmission mechanism 12, and a motor drive circuit 20, from among which the motor 10, the transmission mechanism 12, and the motor drive circuit 20 are accommodated in a housing of the tool body 2.

The grip portion 4 is a portion to be gripped by a hand of a user of the electric power tool 1 to use the electric power tool 1. The blade 6 is a narrow, elongated plate-shaped metal member for cutting materials to be processed, of which one longitudinal end is removably fixed to the blade holder 5 protruding from the housing of the tool body 2.

The blade 6 has one toothed side along a longitudinal direction thereof and is capable of cutting materials to be processed by a rotational force of the motor 10 to reciprocate the blade holder 5 in the longitudinal direction of the blade 6.

The trigger 7 is an operation unit to be operated by the user to command reciprocating driving of the blade 6 (i.e., driving of the motor 10). When the user pulls the trigger 7, a trigger switch 22 (see FIG. 2) in the housing of the tool body 2 is turned into an on-state, thus rotating the motor 10 to operate (reciprocatingly drive) the blade 6.

The lock-off button 8 is a button to permit or prohibit a pull operation of the trigger 7. Turning the lock-off button 8 into a lock state prohibits the pull operation of the trigger 7, while turning the lock-off button 8 into an unlock state permits the pull operation of the trigger 7.

The motor 10 is rotated by electric power supplied from the battery pack 3. The rotational force of the motor 10 is transmitted to the blade 6 via the transmission mechanism 12 and the blade holder 5. The transmission mechanism 12 converts a rotational movement of the motor 10 into a linear movement and transmits the converted movement to the blade holder 5 (and further to the blade 6).

A driving speed of the blade 6 and a rotational speed of the motor 10 are in an approximately linear relationship with each other. As the rotational speed of the motor 10 increases, the driving speed of the blade 6 also increases.

The motor drive circuit 20 controls the driving of the motor 10 (a three-phase brushless motor in the present embodiment) by electric power supplied from the battery 30 in the battery pack 3.

Figure 2:
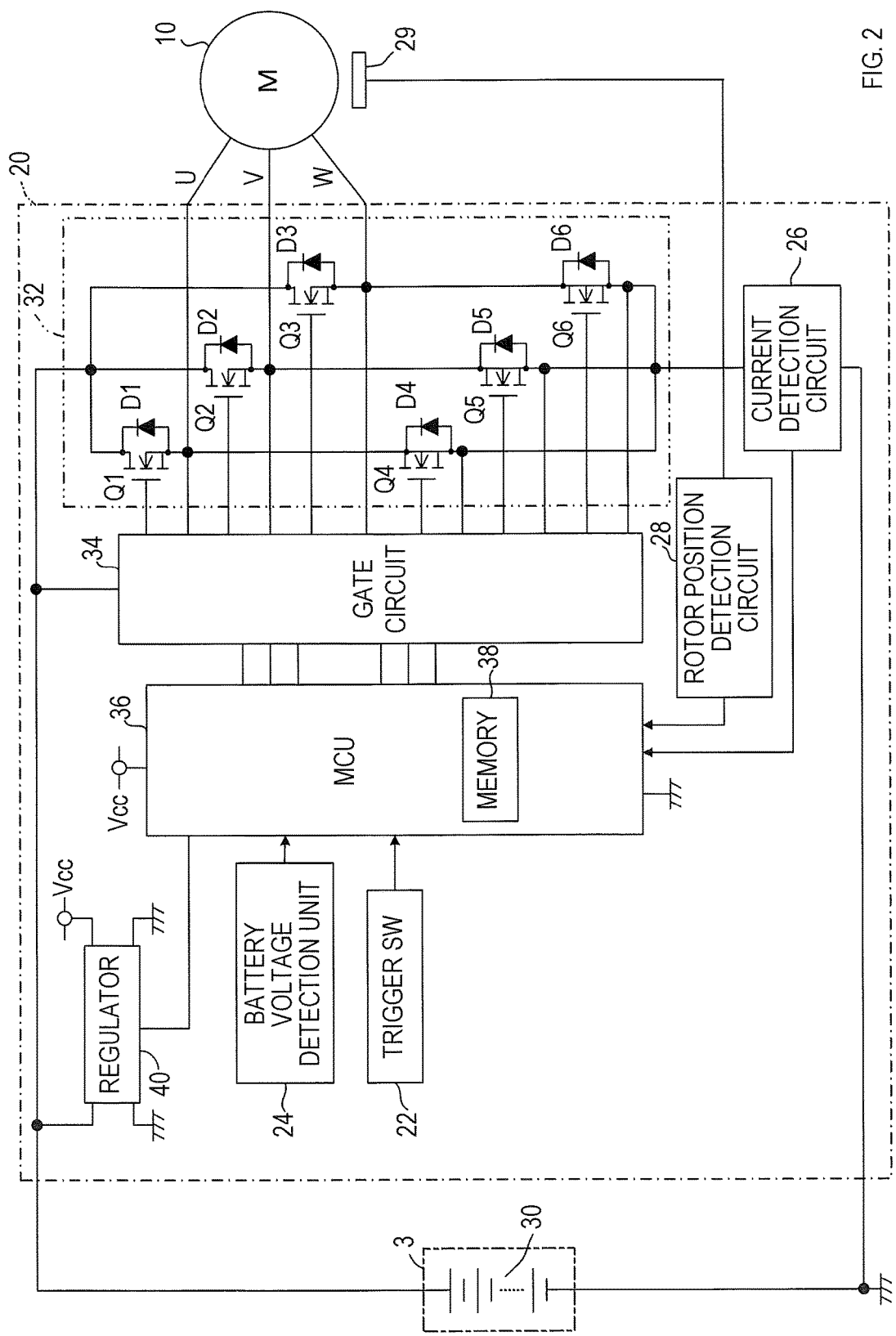
FIG. 2 is a block diagram illustrating a configuration of a motor drive circuit provided in the electric power tool.

As shown in FIG. 2, the motor drive circuit 20 comprises a bridge circuit 32, a gate circuit 34, a main control unit (MCU) 36, and a regulator 40.

The bridge circuit 32 causes an electric current to flow in phase windings of the motor 10 by the electric power supplied from the battery 30, and is configured as a three-phase full bridge circuit including switching elements Q1 to Q6 in the present embodiment.

In the bridge circuit 32, three switching elements Q1 to Q3 are provided, as so-called high-side switches, between individual terminals U, V, and W of the motor 10 and a power-supply line (positive power-supply line) coupled to a positive electrode side of the battery 30.

The remaining three switching elements Q4 to Q6 are provided, as so-called low-side switches, between individual terminals U, V, and W of the motor 10 and a ground line coupled to a negative electrode side of the battery 30.

The switching elements Q1 to Q6 are each configured as an n-channel MOSFET in the present embodiment. Thus, diodes D1 to D6 (so-called parasitic diodes) are each coupled in parallel between a drain and a source of a corresponding one of the switching elements Q1 to Q6 in a forward direction from the source to the drain.

Accordingly, each of the diodes D1 to D6 allows an electric current to flow from the negative electrode side to the positive electrode side of the battery 30 when its corresponding one of the switching elements Q1 to Q6 is in an off-state.

The gate circuit 34 turns on and off the switching elements Q1 to Q6 in the bridge circuit 32 according to corresponding control signals outputted from the MCU 36, thus causing an electric current to flow in the phase windings of the motor 10 to rotate the motor 10.

The MCU 36 controls the driving and braking of the motor 10 via the gate circuit 34. The MCU 36 according to the present embodiment is provided as a microcomputer configured with a CPU, a ROM, a RAM, etc. The MCU 36 may be provided as a combination of various individual electronic components instead of a microcomputer, may be provided as an ASIC (Application Specified Integrated Circuit), may be provided as a programmable logic device such as an FPGA (Field Programmable Gate Array), or may be provided as any combination thereof.

The MCU 36 is provided with a non-volatile memory 38 for storing conditions (including abnormalities) of the motor 10 to be controlled and of the motor drive circuit 20.

The trigger switch (hereinafter, a switch is indicated as a SW) 22 a battery voltage detection unit 24, a current detection circuit 26, and a rotor position detection circuit 28 are coupled to the MCU 36.

The trigger SW 22 is configured to be in the on-state while the trigger 7 is operated and to have a resistance value variable according to an operation amount (pull amount) of the trigger 7.

The battery voltage detection unit 24 detects a battery voltage inputted from the battery pack 3 to the motor drive circuit 20.

The current detection circuit 26 is provided in a current flow path to the motor 10 leading from the bridge circuit 32 to the ground line, to detect an electric current flowing in the motor 10.

The rotor position detection circuit 28 detects a rotational position (i.e., a rotational angle) of the motor 10 by shaping waveforms of detection signals from the rotation sensor 29 arranged in the motor 10.

Thus, the rotation sensor 29 comprises three Hall sensors arranged around a rotor of the motor 10. The three Hall sensors output Hall signals corresponding to U, V, and W phases of the motor 10 that switch their respective increase/decrease directions every time the rotor rotates by an electrical angle of 180 degrees.

The rotor position detection circuit 28 shapes waveforms of the Hall signals of the U, V, and W phases to generate pulse-shaped Hall signals (see FIG. 3) switching between positive and negative at every electrical angle of 180 degrees of the rotor, and detects the rotational position of the motor 10 (specifically, the rotor) at an electrical angle interval of 60 degrees from an edge of each Hall signal.

The waveform-shaped Hall signals of the U, V, and W phases are inputted from the rotor position detection circuit 28 to the MCU 36, which thereby detects the rotational position of the motor 10 from signal levels of the individual Hall signals.

The regulator 40 generates a power supply voltage (a constant direct-current voltage) for operating components of the motor drive circuit 20 by the electric power supplied from the battery 30. The components of the motor drive circuit 20 including the MCU 36 are operated on the power supply voltage from the regulator 40 as a power source.

A control process will be described next that is executed in the MCU 36 to control the driving and braking of the motor 10.

In the present embodiment, the MCU 36 functions as one example of a control unit of the present disclosure.

Figure 3:
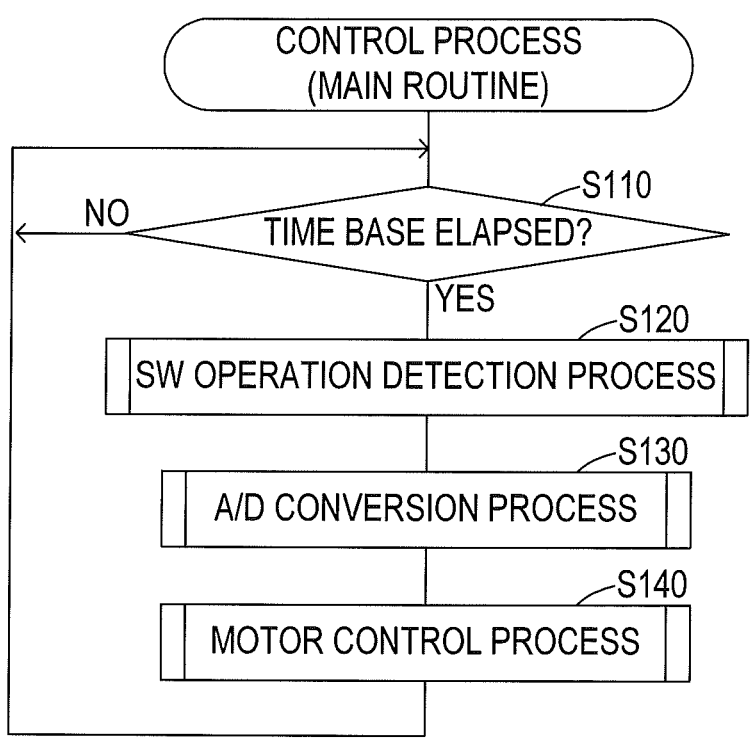
FIG. 3 is a flowchart illustrating a control process executed by a main control unit to control a motor.

As shown in FIG. 3, the MCU 36 repetitively executes a series of processes of S120 to S140 (S refers to Step) at a given control cycle (time base).

To be more specific, the MCU 36 determines in S110 whether the time base has elapsed. In doing so, the MCU 36 waits for the given control cycle to elapse. When it is determined in S110 that the time base has elapsed, the process proceeds to S120.

In S120, a switch operation detection process is executed that detects a user operation of the trigger SW 22 by checking the on/off-state of the trigger SW 22, and then the process proceeds to S130.

In S130, an A/D conversion process is executed that performs A/D conversion of a signal indicating the operation amount of the trigger 7 inputted when the trigger SW 22 is in the on-state, as well as of detection signals from the battery voltage detection unit 24 and the current detection circuit 26, to take in the A/D converted signals.

In S140 to follow, a motor control process is executed that controls the driving and braking of the motor 10 based on the on/off-state of the trigger SW 22, the operation amount of the trigger 7, the battery voltage, the electric current, etc. obtained in S120 and S130. The process then proceeds to S110.

Figure 4:
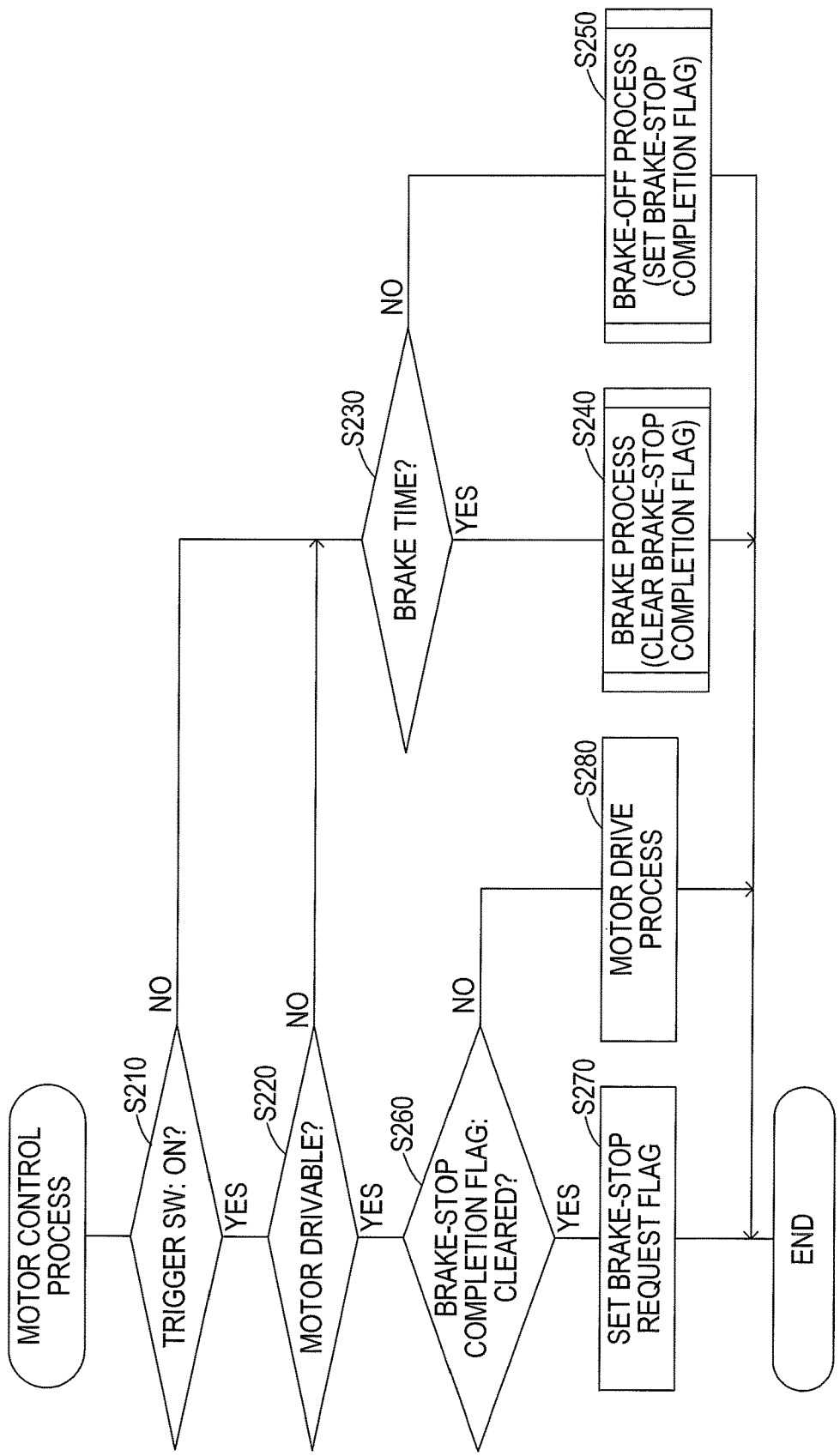
FIG. 4 is a flowchart illustrating, in detail, a motor control process shown in FIG. 3.

Next, as shown in FIG. 4, in this motor control process, it is determined in S210 whether the trigger SW 22 is in the on-state. If the trigger SW 22 is not in the on-state, no drive command for the motor 10 has been inputted externally (by the user), and thus the process proceeds to S230.

If it is determined in S210 that the trigger SW 22 is in the on-state, the process proceeds to S220, in which it is determined whether the motor 10 is drivable based on the aforementioned battery voltage and electric current. If the motor10 is drivable, the process proceeds to S260 to drive the motor 10. If the motor 10 is not drivable, the process proceeds to S230.

In S230, it is determined whether it is currently a brake time to brake the motor 10, based on changes in the aforementioned Hall signals, etc. If it is currently the brake time, the process proceeds to S240, in which a brake process is executed that brakes the motor 10 by short-circuit braking. The motor control process is then terminated.

In the brake process, soft braking by two-phase short-circuit braking is performed right after a start of a brake control, and switches the brake control from the soft braking to three-phase short-circuit braking based on a time period elapsed thereafter, etc., to adjust a braking force to be generated on the motor 10.

In S240, it is thus set whether to employ the two-phase short-circuit braking, which turns on two of the switching elements Q4, Q5, and Q6 (low-side switches) in the bridge circuit 32 or the three-phase short-circuit braking, which turns on the three low-side switches.

In the brake process of S240, a brake-stop completion flag is cleared.

If it is determined in S230 that it is not currently the brake time, a brake-off process that terminates the brake control is executed. The motor control process is then terminated.

In the brake-off process of S250, the brake-stop completion flag is set.

Next in S260, it is determined whether the brake control has been completely terminated based on whether the brake-stop completion flag is cleared.

If the brake-stop completion flag is cleared, the process proceeds to S270, in which a brake-stop request flag is set. The motor control process is then terminated.

If it is determined in S260 that the brake-stop completion flag is not cleared (i.e., that it is set), the brake control has been completely terminated, and thus the process proceeds to S280, in which a motor drive process is executed. The motor control process is then terminated.

In this motor drive process, the rotational speed of the motor 10 (or the electric current supplied to the motor 10) is gradually increased to the rotational speed (electric current) corresponding to the operation amount of the trigger 7, and a drive duty ratio for controlling the motor 10 in a target rotational state is calculated.

A Hall-signal interruption process will be described next that is executed in the MCU 36 at every electrical angle of 60 degrees of the motor 10 by the Hall signals of the U, V, and W phases inputted from the rotor position detection circuit 28.

Figure 5:
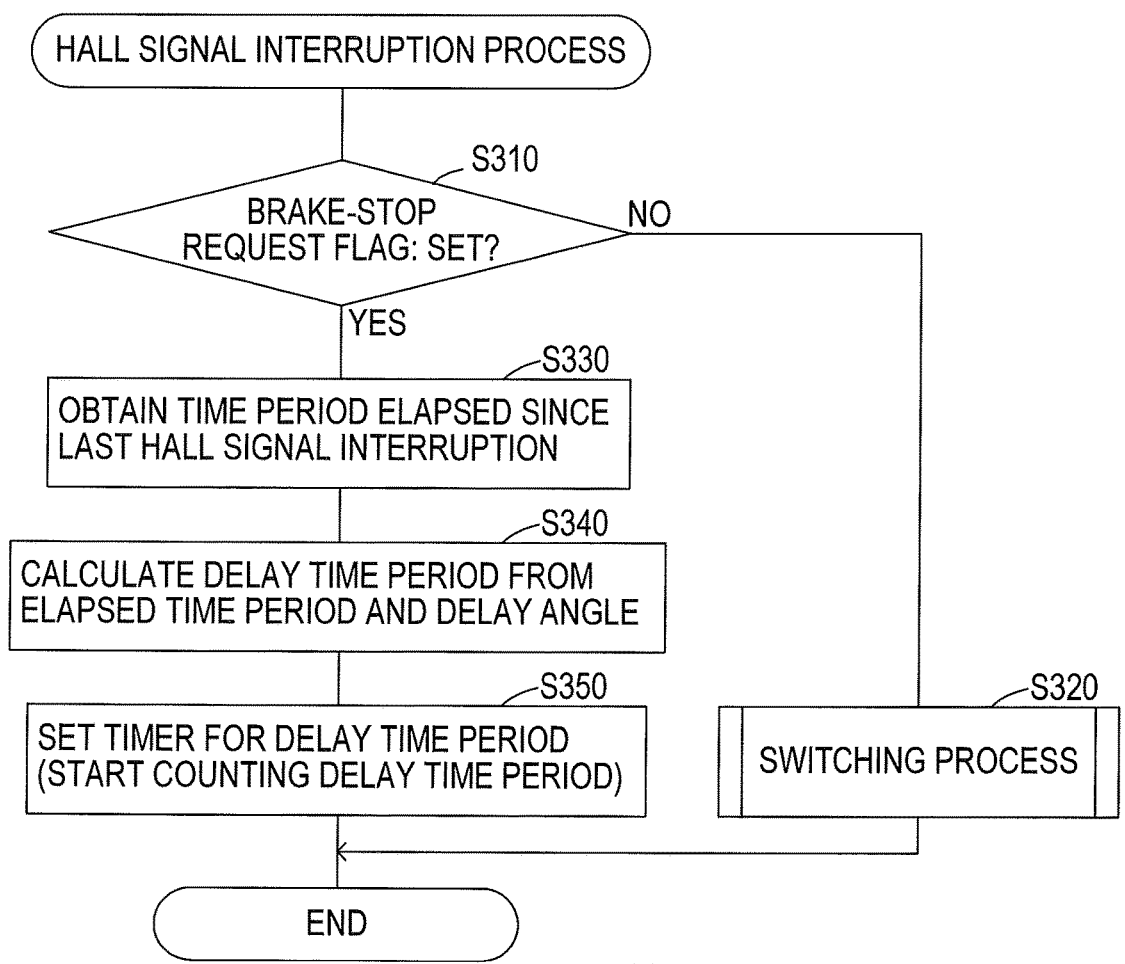
FIG. 5 is a flowchart illustrating a Hall signal interruption process executed by the main control unit.

As shown in FIG. 5, in the Hall signal interruption process, it is determined in S310 whether the brake-stop request flag is set. If the brake-stop request flag is not set, the process proceeds to S320.

In S320, a switching control is executed to PWM control the electric current supplied to the motor 10 based on the drive duty ratio calculated in S280 and to perform the short-circuit braking set in the brake process of S240.

The switching control executed in S320 is a process to separately control the on/off-state of the individual switching elements Q1 to Q6 in the bridge circuit 32 by outputting drive signals to the gate circuit 34.

In driving the motor, for example, drive signals turning on one of the switching elements Q1 to Q3 on the positive side (high-side switches) and one of the switching elements Q4 to Q6 on the negative side (low-side switches) are generated and outputted to the gate circuit 34.

Figure 7:
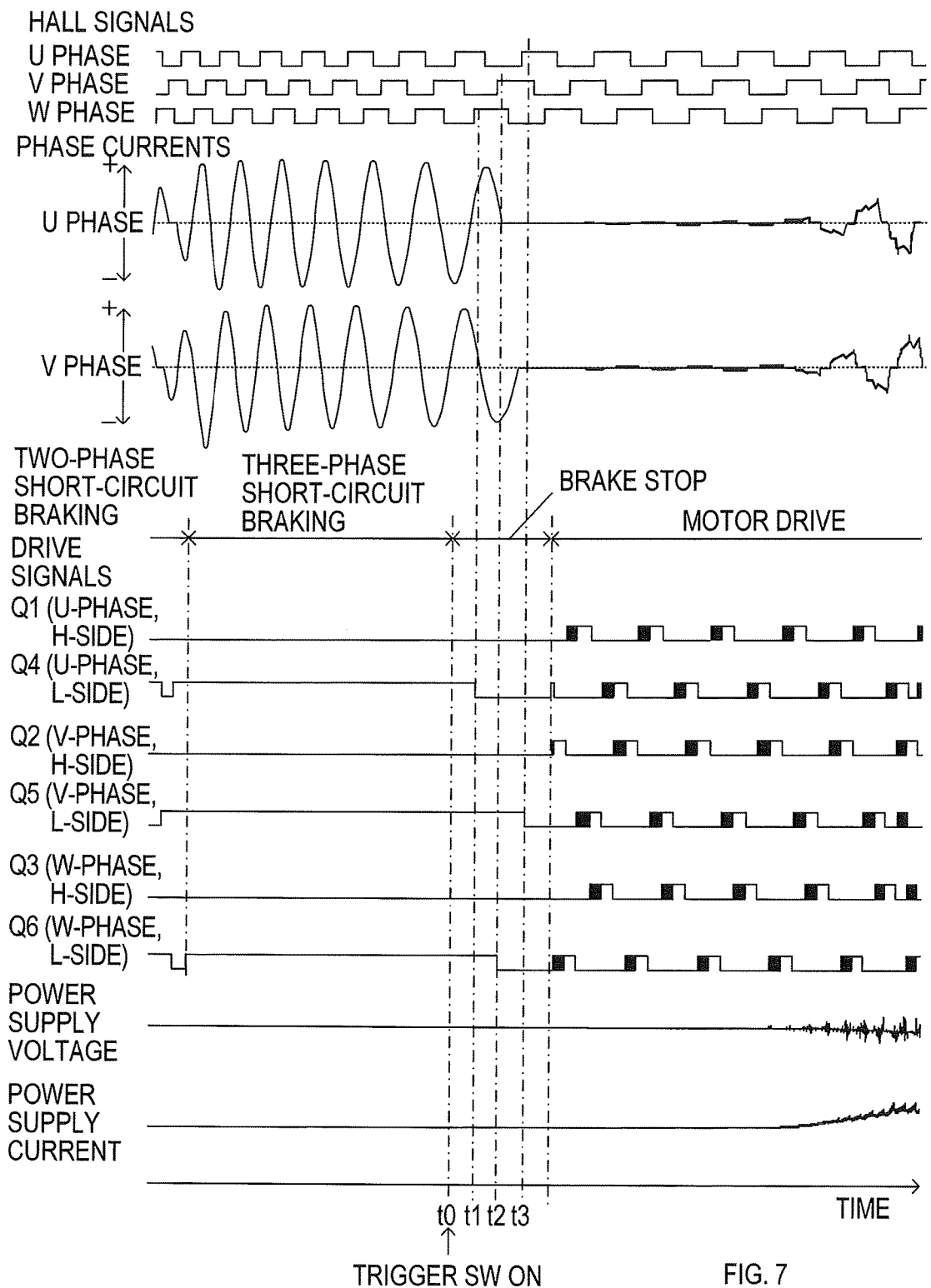
FIG. 7 is a timing diagram illustrating changes in drive signals and phase electric currents in a transition from a brake control to a drive control according to the embodiment.

Further in driving the motor, providing the drive signals for either the high-side switches or the low-side switches as PWM signals having the drive duty ratio calculated in S280 allows the switches to be driven at the duty ratio (see the drive signals in driving the motor shown in FIG. 7).

In braking the motor, switching elements (low-side switches) to be turned into the on-state are specified according to a type of the short-circuit braking (the two-phase short-circuit braking or the three-phase short-circuit braking) set in the brake process of S240, and then the drive signals are outputted to the gate circuit 34 (see the drive signals in the short-circuit braking shown in FIG. 7).

Next, if it is determined in S310 that the brake-stop request flag is set, the process proceeds to S330, in which a time period elapsed since the last Hall signal interruption (i.e., a time period required to rotate the motor 10 by an electrical angle of 60 degrees) is obtained from an internal timer or the like in the MCU 36.

Next in S340, a delay time period is calculated as a time period from the current Hall-signal input timing till a next turning-off of a low-side switch, based on the elapsed time period that has been obtained and a delay angle that has been preset.

The delay angle is a rotational angle of the motor 10 from a rotational position of the motor 10 where one of the Hall signals is inputted to a rotational position optimum to turn off a low-side switch that is currently in the on-state. In S340, a time period required from the present to rotate the motor 10 by the delay angle is calculated as a delay time period.

The rotational position optimum to turn off a low-side switch is set within a conduction range in which a brake current can keep flowing via the diodes (D4 to D6) when the low-side switches (Q4 to Q6) are turned from the on-state into the off-state.

In S350, a timer-interruption-timing counting timer is set for the delay time period calculated in S340, and counting of the delay time period is started. The Hall-signal interruption process is then terminated.

Figure 6:
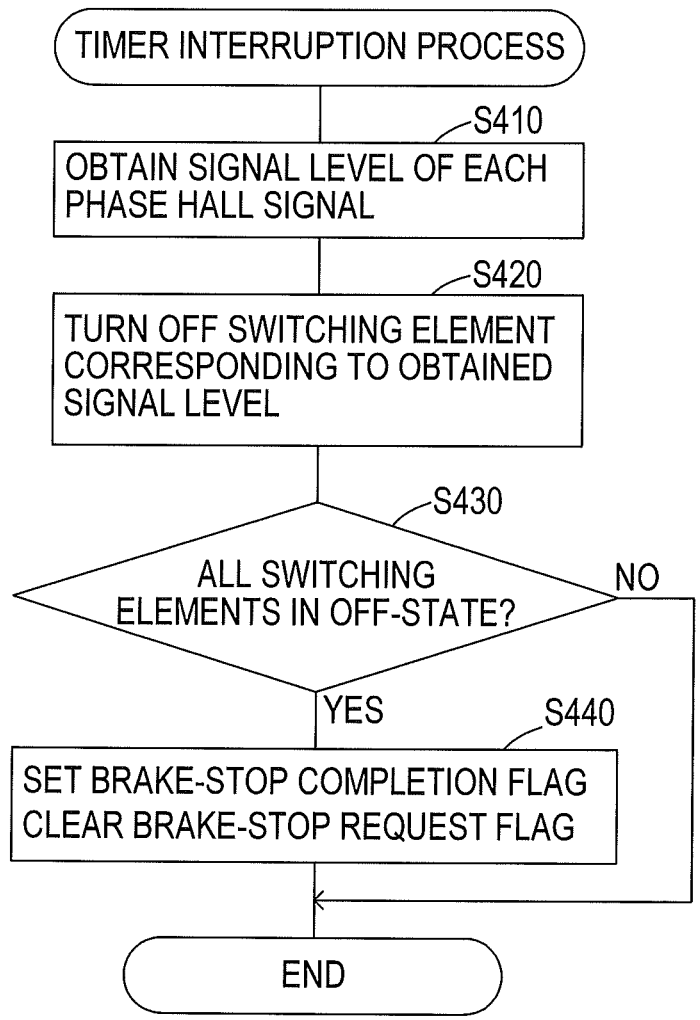
FIG. 6 is a flowchart illustrating a timer interruption process executed by the main control unit.

As shown in FIG. 6, in a timer interruption process executed by an interruption signal from the timer set for the delay time period in S350, the respective signal levels of the U, V, and W phase Hall signals inputted from the rotor position detection circuit 28 are obtained in S410.

In S420, any one of the low-side switches (switching elements Q4 to Q6) that is currently at a rotational position where the switch should be turned off is specified based on the obtained signal levels of the U, V, and W phase Hall signals, and then the specified low-side switch is turned off.

Next in S430, it is determined whether all the low-side switches (switching elements Q4 to Q6) have been turned into the off-state in S420 by execution of the timer interruption process.

If it is determined in S430 that there is a low-side switch in the on-state, the timer interruption process is terminated.

If it is determined in S430 that all the low-side switches are in the off-state, the brake control has been completely stopped. Thus, the brake-stop completion flag is set, and the brake-stop request flag is reset. The timer interruption process is then terminated.

As described above, the motor drive circuit 20 performs the drive control and the brake control of the motor 10 in the electric power tool 1 according to the present embodiment.

When a drive command for the motor 10 is inputted by operation of the trigger 7, it is determined whether the brake control is being performed. If the brake control is being performed, the brake control is stopped and the motor drive control is started.

Figure 8:
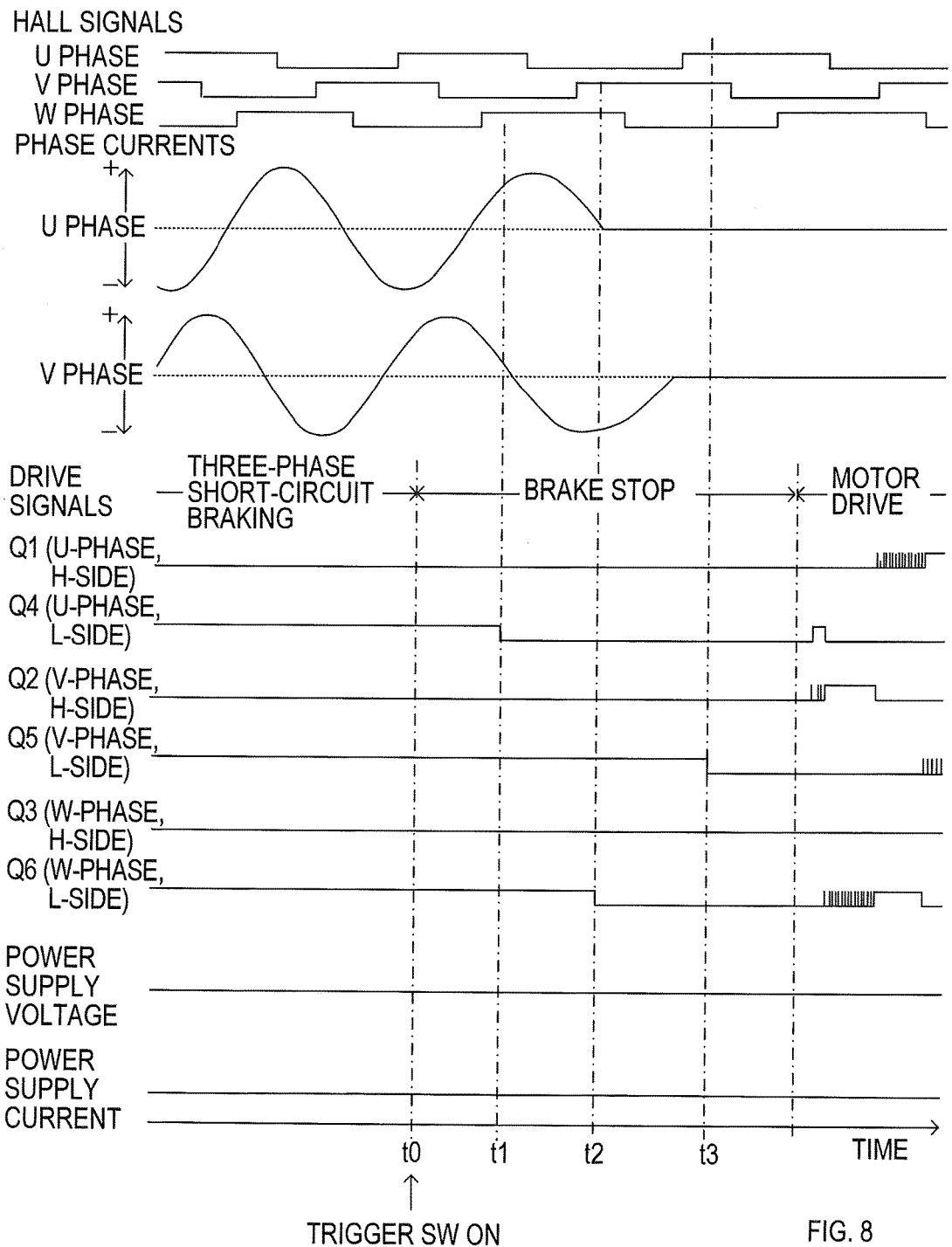
FIG. 8 is a timing diagram illustrating, in close-up, changes in the drive signals and the phase electric currents in a transition from three-phase short-circuit braking to the drive control shown in FIG. 7.
Figure 9:
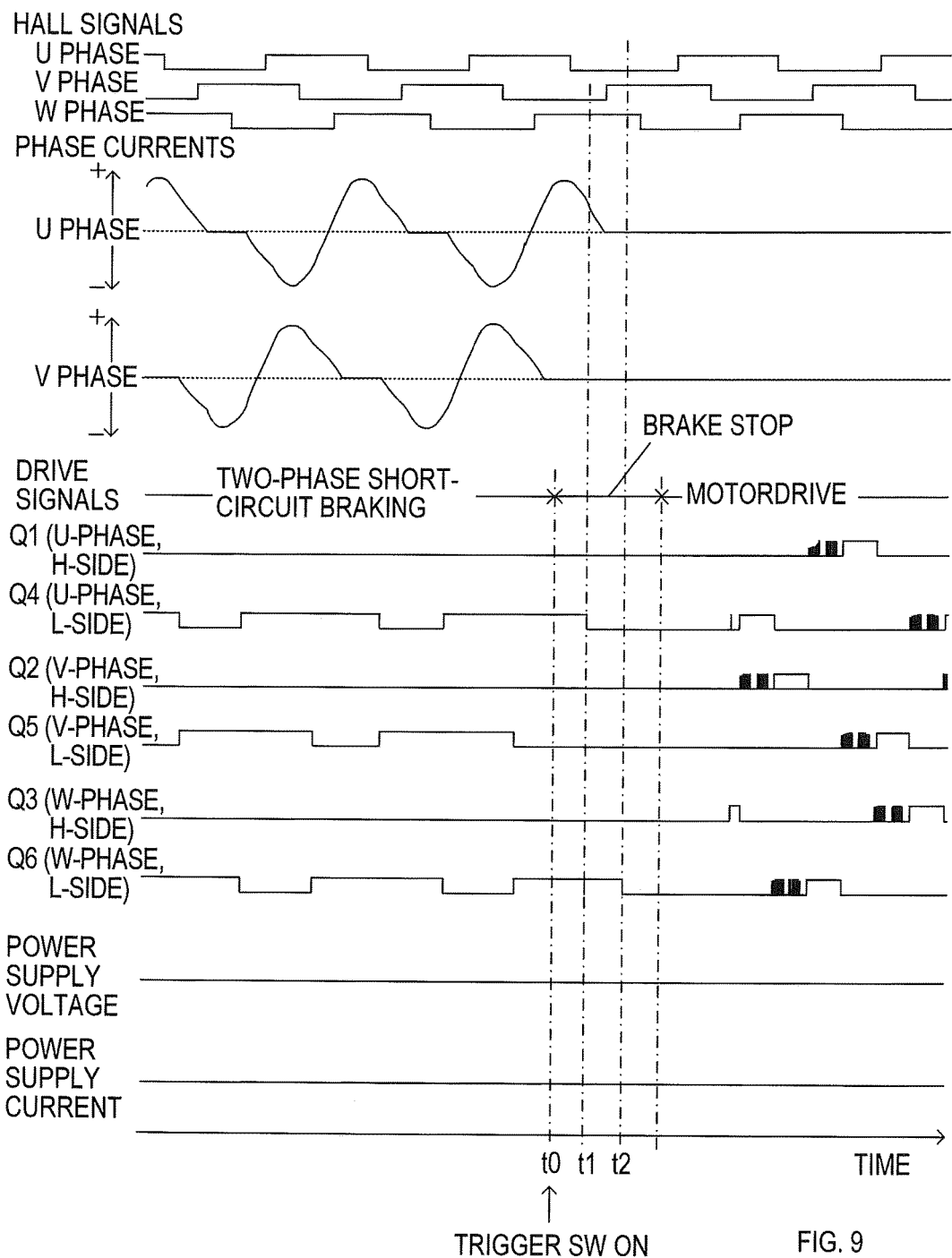
FIG. 9 is a timing diagram illustrating changes in the drive signals and the phase electric currents when a drive command is inputted while two-phase short-circuit braking shown in FIG. 7 is performed.

In stopping the brake control, the low-side switches (Q4 to Q6) for the short-circuit braking that have been turned into the on-state by the brake control are switched into the off-state, of which switching timings are controlled to respective rotational positions optimum for the individual switches as shown in FIG. 8 and FIG. 9.

When a drive command is inputted (at point t0) while the three-phase short-circuit braking is being performed, the three low-side switches (Q4 to Q6) in the on-state are turned off, one by one, at respective timings (t1 to t3) that allow a brake current to keep flowing via the diodes D4 to D6 (see FIG. 8).

Similarly, when a drive command is inputted (at point t0) while the two-phase short-circuit braking is being performed, the two low-side switches (Q4 and Q6) in the on-state are turned off, one by one, at respective timings (t1 and t2) that allow a brake current to keep flowing via the diodes (D4 and D6) (see FIG. 9).

In other words, according to the present embodiment, when a drive command for the motor 10 is inputted via the trigger 7 while the brake control is being performed, the brake control is continued until a given timing when no further regenerative current flows via the bridge circuit 32.

Further according to the present embodiment, when a drive command for the motor 10 is inputted via the trigger 7 while the brake control is being performed, the number of short-circuited phases where the windings of the motor 10 are short circuited via the bridge circuit 32 is reduced from three to two or from two to one, thus switching control methods of the brake control to reduce the brake current.

Figure 10:
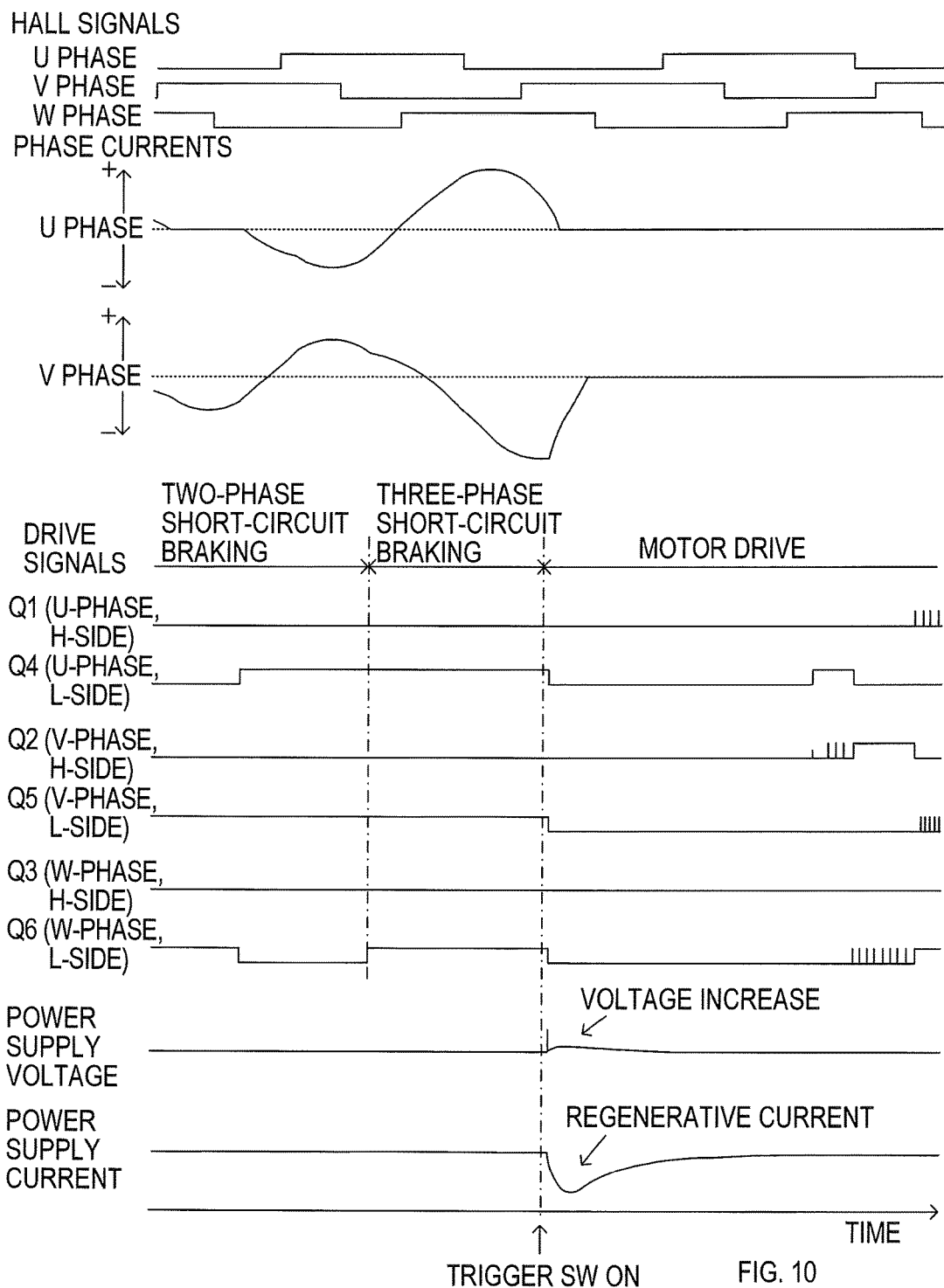
FIG. 10 is a timing diagram illustrating changes in the drive signals and the phase electric currents in conventional switching of controls corresponding to FIG. 8.
Figure 11:
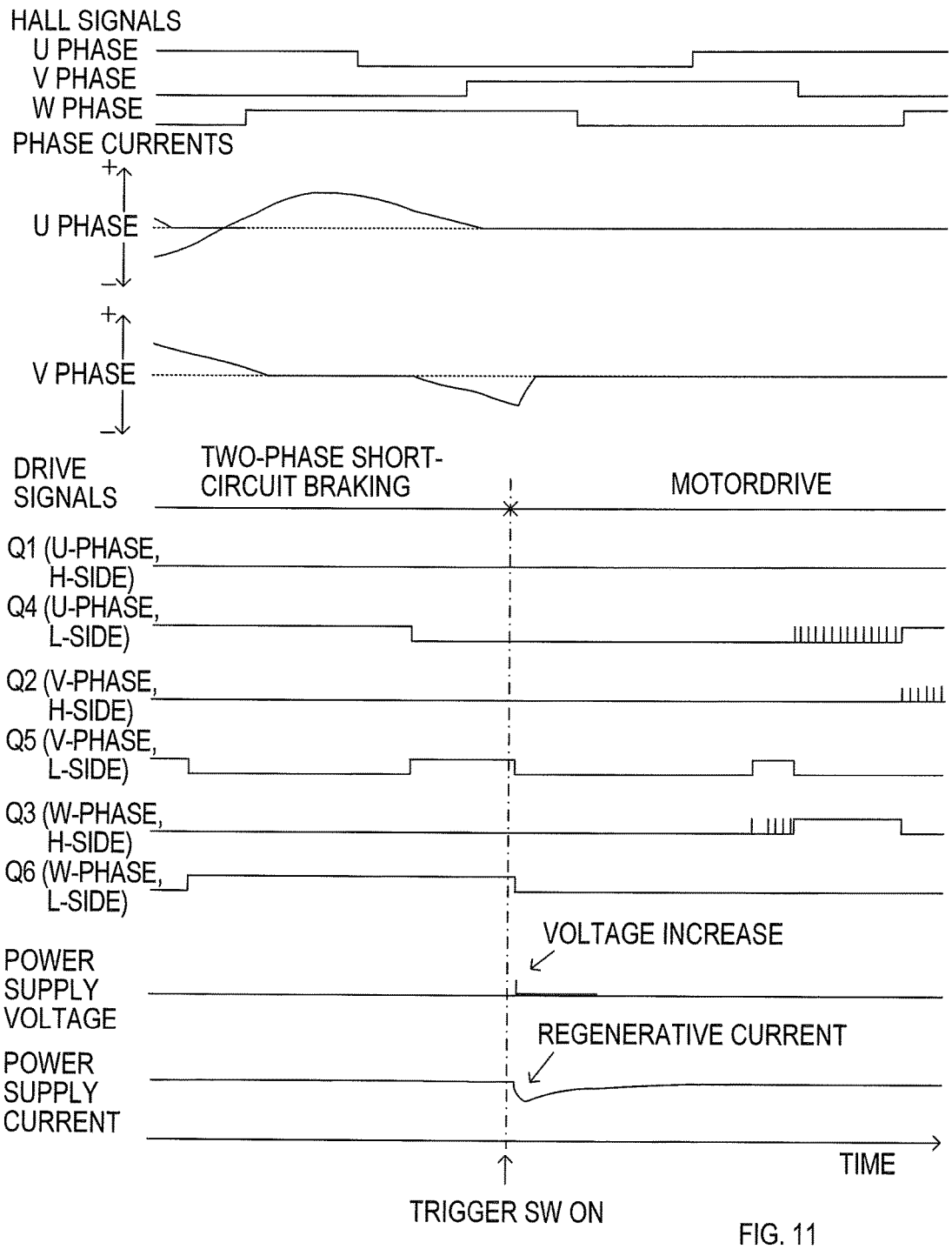
FIG. 11 is a timing diagram illustrating changes in the drive signals and the phase electric currents in conventional switching of controls corresponding to FIG. 9.

The present embodiment thus inhibits generation of a regenerative current in comparison with conventional cases shown in FIG. 10 and FIG. 11, where all the low-side switches (Q4 to Q6) having been turned into the on-state by the brake control are turned into the off-state at a timing (point t0) when a drive command is inputted.

Thus, as shown in FIG. 10 and FIG. 11, whether while the three-phase short-circuit braking is being performed or the two-phase short-circuit braking is being performed, concurrently turning the switching elements having been in the on-state for the short-circuit braking into the off-state when a drive command is inputted generates a regenerative current.

In contrast, the present embodiment inhibits the generation of a regenerative current since the switching elements having been in the on-state for the short-circuit braking are turned into the off-state, one by one, at their respective rotational positions optimum to allow a brake current to flow in the diodes.

Thus, the present embodiment inhibits an increase in the power supply voltage (battery voltage) caused by the regenerative current in a transition from the brake control to the motor drive control, allowing for a proper drive control of the motor according to the drive command inputted via the trigger 7.

An embodiment of the present disclosure has been described above. However, the present disclosure should not be limited to the above-described embodiment and can take various forms without departing from the scope of the present disclosure.

For example, the above-described embodiment is configured such that, when a drive command is inputted via the trigger 7, the MCU 36 determines whether the brake control is being performed, and that, if the brake control is being performed, the brake control is stopped in such a manner as to generate no regenerative current and then the motor drive control is started.

However, the MCU 36 may use separate routines to execute the brake control process and the motor drive control process. In the motor drive control process, control operation may be changed between when the brake control is performed and when the brake control is not performed.

Figure 12:
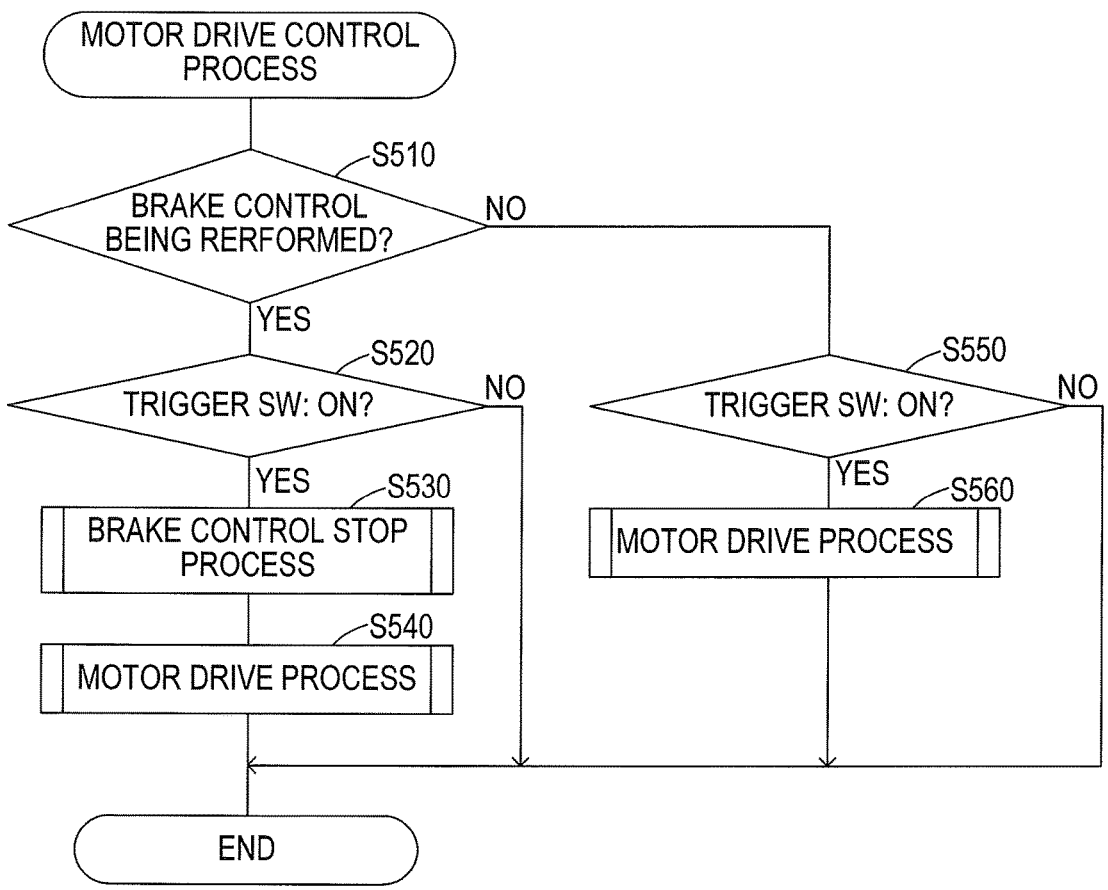
FIG. 12 is a flowchart illustrating a motor drive control process according to a modified embodiment.

In this case, as shown in FIG. 12, it is determined in S510 whether the brake control is currently being performed in the motor drive control process.

If the brake control is being performed, the processes of S520 to S540 are executed; if the brake control is not being performed, the processes of S550 and S560 are executed.

To be more specific, if the brake control is being performed, it is determined in S520 whether the trigger SW 22 is in the on-state. If the trigger SW 22 is in on-state, the process proceeds to S530, in which a brake control stop process is executed.

The brake control stop process is executed in a similar manner to the Hall signal interruption process and the timer interruption process shown in FIG. 5 and FIG. 6, and all the low-side switches (Q4 to Q6) having been turned into the on-state by the brake control are turned, one by one, into the off-state.

When all the low-side switches (Q4 to Q6) are turned into the off-state by the brake control stop process, the process proceeds to S540, in which a motor drive process is executed.

In this motor drive process, processes similar to S280 and S320 in the above-described embodiment are executed, thus PWM controlling the electric current supplied to the motor 10. This motor drive process is executed until when the trigger SW 22 is turned into the off-state. When the trigger SW 22 is turned into the off-state, the motor drive control process is temporarily terminated.

If it is determined in S520 that the trigger SW 22 is not in the on-state, the motor drive control process is also temporarily terminated.

If the brake control is not performed, it is determined in S550 whether the trigger SW 22 is in the on-state. If the trigger SW 22 is in the on-state, the process proceeds to S560, in which a motor drive process is executed.

This motor drive process is executed in a similar manner to S540 although the rotational speed of the motor 10 is different when the driving of the motor is started, and is continued until when the trigger SW 22 is turned into the off-state.

When the trigger SW 22 is turned into the off-state, the motor drive control process is temporarily terminated. If it is determined in S550 that the trigger SW 22 is not in the on-state, the motor drive control process is also temporarily terminated.

As described above, in the motor drive control process shown in FIG. 12, the MCU 36 performs the motor drive control in different manners between when the brake control is performed and when the brake control is not performed. Such a configuration also allows the brake control stop process to be executed in a similar manner to the above-described embodiment when the trigger SW 22 is turned into the on-state while the brake control is being performed, thus starting the motor drive control.

Thus, the motor drive control process executed as shown in FIG. 12 can also inhibit the generation of the regenerative current flowing when the brake control is stopped to start driving the motor, providing a similar effect to that provided in the above-described embodiment.

The above embodiment has described the electric power tool 1 as a reciprocating saw. However, the present disclosure also targets such electric power tools as common power tools including drill drivers, impact drivers, and grinders, as well as gardening power tools including brush cutters for cutting grasses and small bushes, and chainsaws.

The present disclosure may be applied to an electric power tool provided with a battery as a direct-current power source, an electric power tool operated with power supplied from an external direct-current power source such as an AC adaptor, or an electric power tool operated with power supplied from an alternating-current power source such as a commercial power source.

Further, the present disclosure should not be limited to electric power tools. Application of the present disclosure to any device performing a motor drive control using a bridge circuit provides a similar effect to that provided in the above-described embodiment.

The above embodiment has described that the brake control of the motor 10 adjusts the braking force to be generated on the motor 10 by selectively performing the two-phase short-circuit braking or the three-phase short-circuit braking.

However, the present disclosure may carry out the brake control, for example, only by the two-phase short-circuit braking or the three-phase short-circuit braking, or may carry out a combination of one or both of these types of braking with another brake control.

In other words, the present disclosure allows any device that switches the switching elements in the bridge circuit 32 into the on-state in a brake control and switches the switching elements into the off-state to stop the brake control to provide a similar effect to that described above by setting the switching timings in a similar manner to the above-described embodiment.

Thus, the present disclosure may also be applied, in a similar manner to the above-described embodiment, to such a configuration in which, for example, short-circuit braking is performed by turning the low-side switches in the bridge circuit 32 into the off-state and turning at least part of the high-side switches into the on-state.

What is claimed is:

1. An electric power tool comprising:
   a motor;
   an operation unit comprising a trigger that initiates a drive command for driving the motor;
   a bridge circuit comprising a plurality of switching elements, the bridge circuit being configured to switch current flow paths to the motor by the plurality of switching elements each of the plurality of switching elements including a diode coupled thereto in parallel; and
   a control unit configured to control the plurality of switching elements in the bridge circuit according to the drive command inputted to the operation unit, to thereby control driving of the motor, the control unit being further configured to perform a brake control when the motor is braked, and the control unit being further configured to perform, in response to the drive command inputted to the operation unit during the brake control being performed, a regenerative current inhibition control to thereafter stop the brake control, the brake control being set to turn on at least part of the plurality of switching elements in the bridge circuit to generate a braking force on the motor, and the regenerative current inhibition control being set to turn off each of all switching elements that are on, from among the plurality of switching elements in the bridge circuit, at given individual timings to inhibit a regenerative current from flowing in a power source of the motor, each of the given individual timings being a timing that allows a brake current to flow via the diode of each corresponding one of all the switching elements that are on in the bridge circuit.

2. The electric power tool according to claim 1, wherein the regenerative current inhibition control is set to continue the brake control until a given timing when no further regenerative current flows in the power source of the motor via the bridge circuit.

3. The electric power tool according to claim 1, wherein the regenerative current inhibition control is set to reduce a brake current flowing in the motor by switching control methods of the brake control.

4. The electric power tool according to claim 1,
   wherein the motor comprises windings of a plurality of phases,
   wherein the brake control is set to control the plurality of switching elements in the bridge circuit to generate the braking force by short-circuiting at least two phases out of the windings of the plurality of phases, and
   wherein the regenerative current inhibition control is set to reduce phases short-circuited in the brake control.

5. The electric power tool according to claim 4,
   wherein the windings of the plurality of phases comprise windings of three phases,
   wherein the brake control is set to perform three-phase short-circuit braking that short-circuits the three phases, and
   wherein the regenerative current inhibition control is set to perform two-phase short-circuit braking that short-circuits two phases of the three phases.

6. The electric power tool according to claim 5,
   wherein the brake control is set to perform two-phase short-circuit braking that short-circuits two phases out of the plurality of phases, and
   wherein the regenerative current inhibition control is set to perform one-phase short-circuit braking that short-circuits one phase of the two phases.

7. The electric power tool according to claim 5,
   wherein the brake control is set to perform two-phase short-circuit braking that short-circuits two phases out of the plurality of phases, and
   wherein the regenerative current inhibition control is set to perform one-phase short-circuit braking that short-circuits one phase of the two phases.

8. The electric power tool according to claim 1, wherein the control unit is configured
   (i) to perform the brake control at least when the drive command is not inputted thereto from the operation unit,
   (ii) to control the plurality of switching elements in the bridge circuit to reduce a brake current flowing in the motor in the regenerative current inhibition control, and
   (iii) to start driving the motor without performing the regenerative current inhibition control in response to the drive command inputted to the operation unit under a situation where the control unit is not performing the brake control.

* * * * *

UNITED STATES PATENT AND TRADEMARK OFFICE
CERTIFICATE OF CORRECTION

PATENT NO. : 10,348,227 B2
APPLICATION NO. : 15/278523
DATED : July 9, 2019
INVENTOR(S) : Yoshitaka Ichikawa Page 1 of 1

It is certified that error appears in the above-identified patent and that said Letters Patent is hereby corrected as shown below:

In the Claims

On Column 12, Line 39 relating to the preamble of Claim 6, "The electric power tool according to claim 5" should be --The electric power tool according to claim 4--.

Signed and Sealed this
Twenty-ninth Day of October, 2019

Andrei Iancu
*Director of the United States Patent and Trademark Office*